United States Patent
Guthrie et al.

(10) Patent No.: US 6,240,474 B1
(45) Date of Patent: *May 29, 2001

(54) PIPELINED READ TRANSFERS

(75) Inventors: Guy Lynn Guthrie, Austin, TX (US); Richard Allen Kelley, Apex, NC (US); Danny Marvin Neal, Round Rock; Steven Mark Thurber, Austin, both of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/931,705

(22) Filed: Sep. 16, 1997

(51) Int. Cl.[7] .................................................. G06F 13/14
(52) U.S. Cl. ............................... 710/105; 709/230
(58) Field of Search ............................ 709/230, 243; 710/100, 101, 105, 128

(56) References Cited

U.S. PATENT DOCUMENTS

| 4,787,033 | * | 11/1988 | Bomba | 395/296 |
| 4,930,069 | * | 5/1990 | Batra | 395/200.42 |
| 5,146,597 | * | 9/1992 | Williams | 395/741 |
| 5,204,954 | * | 4/1993 | Hammer | 395/842 |
| 5,287,463 | * | 2/1994 | Frame | 395/285 |
| 5,450,407 | * | 9/1995 | Perlman | 370/392 |
| 5,517,626 | | 5/1996 | Archer et al. | 395/290 |
| 5,526,484 | * | 6/1996 | Casper | 395/200.67 |
| 5,537,555 | | 7/1996 | Landry et al. | 395/306 |
| 5,542,053 | | 7/1996 | Bland et al. | 395/309 |
| 5,659,707 | * | 8/1997 | Wang | 711/145 |

FOREIGN PATENT DOCUMENTS 8180012   7/1996   (JP).

OTHER PUBLICATIONS

IBM Technical Disclosure Bulletin, vol. 39, No. 4, Apr. 1996, "Multiword Direct Memory Access Integrated Drive Electronics Hogpen".

IBM Technical Disclosure Bulletin, vol. 39, No. 4, Apr. 1996, "Pseudo Peripheral Component Interconnect Busmaster Transfer".

IBM Technical Disclosure Bulletin, vol. 39, No. 1, Jan. 1996, "Method For Atomic Peer–to–Peer Communication On A Peripheral Component Interconnect Bus".

* cited by examiner

Primary Examiner—Eric Coleman
(74) Attorney, Agent, or Firm—Robert V. Wilder; Richard A. Henkler; Mark E. McBurney

(57) ABSTRACT

A methodology and implementing system are provided in which pipelined read transfers or PRTs are implemented. The PRTs include a request phase and a response phase. The PRT request phase involves a PRT request master delivering to a PRT request target, a source address, a destination address and the transfer size for the data being requested. In the PRT response phase, the PRT request target becomes a PRT response master, i.e. a PCI bus master, and initiates a completion of the transaction that was requested in the originating PRT request.

35 Claims, 8 Drawing Sheets

| SUBSEQUENT TRANSACTION | | PREVIOUS TRANSACTION | | | | | | |
|---|---|---|---|---|---|---|---|---|
| | | 2 PMW | 3 DRR | 4 DWR | 5 DRC | 6 DWC | 7 PRTR | 8 PRTC |
| PMW | 1 | N | Y | Y | Y | Y | Y | Y |
| DRR | 2 | N | Y/N | Y/N | Y/N | Y/N | (Y)/N | (Y)/N |
| DWR | 3 | N | Y/N | Y/N | Y/N | Y/N | (Y)/N | (Y)/N |
| DRC | 4 | N | Y/N | Y/N | Y/N | Y/N | Y | Y |
| DWC | 5 | N | Y/N | Y/N | Y/N | Y/N | Y | Y |
| PRTR | 6 | N | Y/N | Y/N | Y/N | Y/N | Y/N | (Y)/N |
| PRTC | 7 | Y | (Y)/N | (Y)/N | (Y)/N | (Y)/N | Y/N | Y/N |

*FIG. 9*

PIPELINED READ TRANSFERS

RELATED APPLICATIONS

The present application is related to a co-pending application entitled "ORDERING FOR PIPELINED READ TRANSFERS", Ser. No. 08/931,706, filed on even date herewith and assigned to the assignee of the present application.

FIELD OF THE INVENTION

The present invention relates generally to information processing systems and more particularly to an improved information transfer methodology in a computer related environment.

BACKGROUND OF THE INVENTION

As computer systems and networked computer systems proliferate, and become integrated into more and more information processing systems which are vital to businesses and industries, there is an increasing need for faster information processing and increased data handling capacity. Even with the relatively rapid state-of-the-art advances in processor technology, and the resulting increased processor speeds, a need still exists for faster processors and increased system speeds and more efficient information processing methodologies. This need is at least partially due to a growing number of computer applications and capabilities, including extensive network and rich graphics and display applications among others. As new applications for computers are implemented, new programs are developed and those programs are enriched with new capabilities almost on a daily basis. While such rapid development is highly desirable, there is a capability cost in terms of system speed.

One of the sources of inefficiency on the PCI bus in a typical computer environment is the manner in which "read" transactions are handled. When a master device in a computer system issues a read request to read data from a target device in the system, the master has no indication of when the target has gathered the data and has the requested data ready to be transferred back to the requesting master device. The manner in which the master becomes aware that the data is ready for transfer back to the master is to "poll" the target i.e. to re-attempt the request for access to the target. That methodology may result in many wasted attempts by the master before the data is ready to be returned. Each such attempt ties-up the bus and prevents other data transfers to take place during the attempt.

In addition, the target device has no definitive indication as to how much data is being requested to be read and returned to the master. The "READ", "READ LINE" and "READ MULTIPLE" commands currently defined by the PCI specification (PCI Local Bus Specification, Production Version, Revision 2.1, Jun. 1, 1995) may give the target a general indication as to the amount of data being requested, but the target device may end up prefetching data beyond what the master actually needs. Although prefetching boosts performance in certain situations, it also wastes bus and memory bandwidth since only a small percentage of the data fetched may actually delivered to the master device.

Thus, there is a need for an improved information processing methodology and system in which information is more efficiently transferred between master and target devices during information processing transactions.

SUMMARY OF THE INVENTION

A method and apparatus is provided in which Pipelined Read Transfers (PRT) are implemented. The PRT methodology includes a request phase and a response phase. The PRT request phase involves a PRT request master delivering to a PRT request target a source address, a destination address and the transfer size for the data being requested. The PRT response phase involves the PRT request target becoming a PRT response master, i.e. a PCI bus master, and initiating a completion of the transaction that was requested in the originating PRT request.

BRIEF DESCRIPTION OF THE DRAWINGS

A better understanding of the present invention can be obtained when the following detailed description of a preferred embodiment is considered in conjunction with the following drawings, in which:

FIG. 9 is an ordering chart illustrating the ordering priorities for pipelined read transfers.

DETAILED DESCRIPTION

Figure 1:
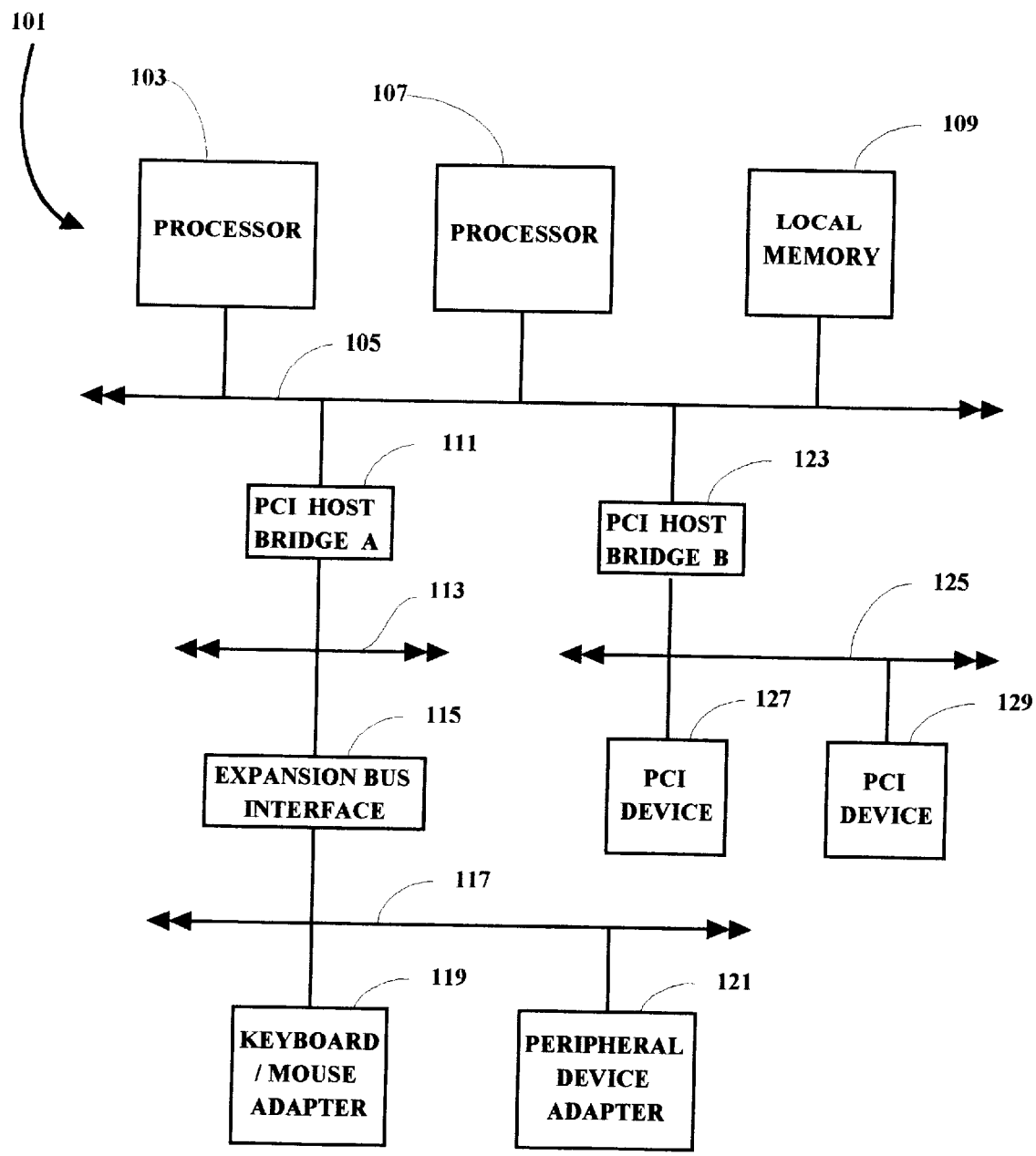
FIG. 1 is a block diagram of a typical computer related information processing system in which an exemplary embodiment of the present invention may be implemented.

With reference to FIG. 1, the various methods discussed herein may be implemented within a typical computer system 101 which may include one or more computers or workstations in various combinations. An exemplary hardware configuration of a computer system which may be used in conjunction with the present invention is illustrated and includes a processor device 103, such as a conventional microprocessor, and a number of other units interconnected through a system bus 105, which may be any host system bus. The system bus may have one or more additional processors connected to the bus such as processor 107. It is noted that the processing methodology disclosed herein will apply to many different bus and/or network configurations. The bus 105, as well as any of the other busses illustrated, may be extended as shown to include further connections to other computer systems, workstations or networks, and other peripherals and the like. The computer system shown in FIG. 1 includes a local memory 109. A local bus controller and DRAM system memory (not shown) are also typically connected to the system bus 105.

The system bus 105 is connected through a PCI (Peripheral Component Interconnect) Host Bridge A circuit 111 to a second bus 113, which, in turn, is connected through an expansion bus interface 115 to a an expansion bus 117 in the present example. The expansion bus 117 may include connections to a keyboard/mouse adapter 119 and also to other peripheral device adapters such as peripheral device adapter 121. The system bus 105 may also be connected through additional bridge circuits such as PCI Host bridge B 123, to a corresponding PCI bus 125 to which additional PCI devices 127 and 129 are connected.

In general, throughout this disclosure, the following conventions and terminology are used. The term "PRT" refers to a pipeline read transfer. The term "PRT request master" is used to refer to a PCI bus master issuing a PRT request command. A "PRT request target" refers to a PCI bus target responding to a PRT request command. A "PRT response master" refers to a PCI bus master returning PRT response data and a "PRT response target" refers to a PCI bus target device accepting PRT response data. A PCI device is a PRT request master when it issues a PRT request. A PCI device is a PRT response target when data is returned by a PRT response master. A PRT request master device typically becomes the PRT response target for the PRT requests that it issues, but it is not required. The PRT response target could be a third device. A PCI device is a PRT request target when it receives a PRT request and a PCI device becomes a PRT response master when it is able to return the PRT requested data.

A PCI to PCI bridge that supports the PRT command will forward PRT requests and PRT responses between its primary and secondary PCI busses. For example a PCI-PCI bridge that receives a PRT request as a PRT request target on a primary PCI bus will forward the PRT request on to the secondary PCI bus by becoming a PRT request master on the second PCI bus. Similarly, a PCI-PCI bridge that receives a PRT response as a PRT response target on a primary PCI bus will forward the PRT response onto the secondary PCI bus by becoming a PRT response master on the secondary PCI bus.

Figure 2:
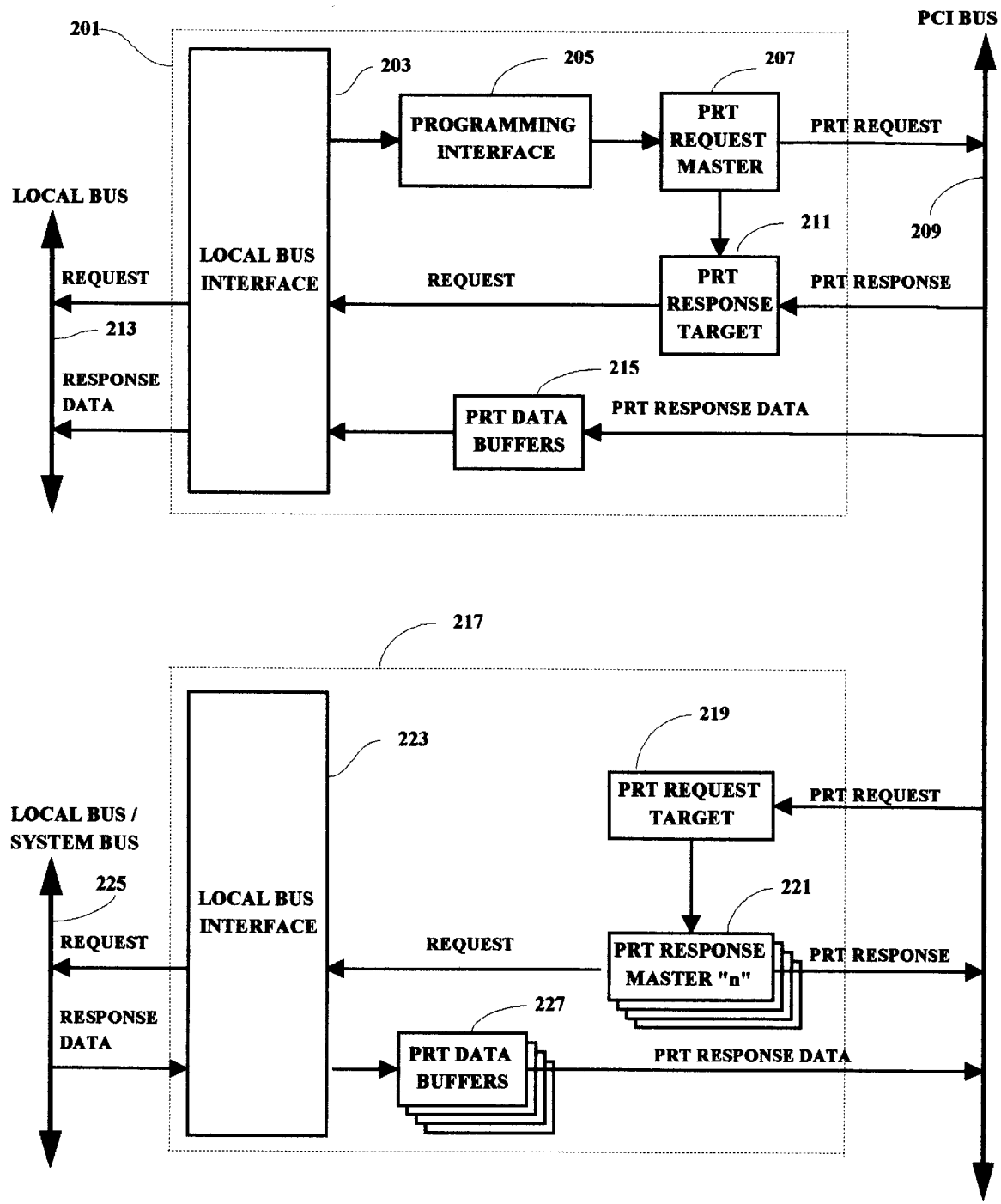
FIG. 2 is a block diagram of an exemplary pipelined read transfer (PRT) master-target configuration.
Figure 3:
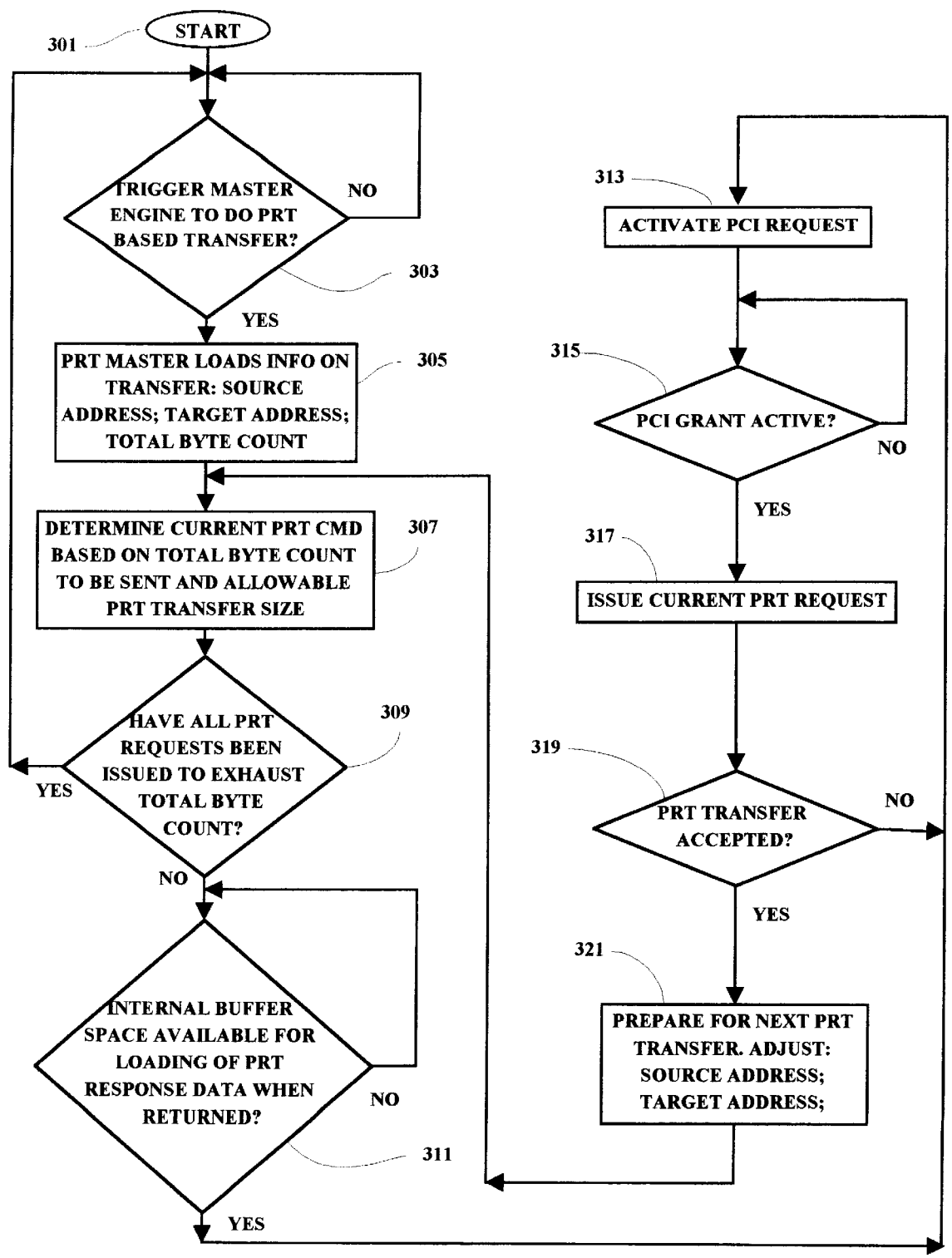
FIG. 3 is a flow chart showing an exemplary functional flow for PRT request master transaction.

In FIG. 2, there is shown an exemplary implementation within which a pipeline read transfer operation may be accomplished. Generally, PRT capable devices will include PRT master logic and PRT target logic. In the present example, however, devices are illustrated with either master or target logic in order to simplify the drawings and facilitate the explanation of an exemplary embodiment. As shown in FIG. 2, a master logic PCI device 201 includes PRT master logic circuitry, and a target logic PCI device 217 includes PRT target logic circuitry. Master logic PCI device 201 is shown connected between a local bus 213 and a PCI bus 209. Target logic PCI device 217 is shown connected between a local or system bus 225 and the PCI bus 209. Master logic PCI device 201 includes a local bus interface circuit 203 which applies a Request signal and a Response Data signal to the local bus 213. The local bus interface circuit 203 is connected through a Programming Interface 205 to a PRT Request Master circuit 207. The PRT Request Master circuit 207 applies a PRT Request to the PCI bus 209 and also applies an input to a PRT Response Target circuit 211. PRT Response Target circuit 211 also has a PRT Response input from the PCI bus 209 and provides a Request output to the Local Bus Interface circuit 203. A group of PRT data buffers 215 are also arranged to receive PRT Response Data from the PCI bus 209 and provide an input to the Local Bus Interface circuit 203.

The target logic PCI device 217 includes a local bus interface 223 and provides a Request output to the local/system bus 225, and receives a Data Response input from the local/system bus 225. The target logic PCI device 217 also includes PRT data buffers 227 which are arranged to receive input from the local/system bus 225 and apply PRT response data to the PCI bus 209. A PRT request target 219 receives a PRT request input from the PCI bus 209 and provides an input to a plurality of PRT response master circuits 221. The PRT response master circuits 221 are arranged to apply Request information to the local bus interface circuit 223.

In an exemplary PRT operation, a PRT request master 207 issues a PRT request when it want to access a PRT request target such as PRT request target 219. The PRT request contains three fields: a source address (SA), a destination address (DA) and a PRT information packet (IP). The PRT source address (PRT SA) is a four byte PCI address which the PRT request target uses to fetch the data. This address is in the PRT request target's PCI memory space. The PRT destination address (PRT DA) is a four byte PCI address in the present example, which the PRT request target uses when returning the data. The PRT DA will typically be a PCI address in the PRT request master's PCI memory space, but could instead be a PCI address in a different or third device's PCI memory space. A PRT size field is included in the PRT IP and indicates the number of bytes being requested. The PRT SA and PRT DA must both be aligned on a four byte boundary and the data being requested to be moved is contained in an area that is within a 4K page region relative to the source address, i.e. the combination of the SIZ field and the PRT SA is contained in a 4K page. The 4K page limit is a trade-off to reduce hardware complexity in the PRT request target and should be transparent to the software in the present example. Any fields marked reserved in a PRT command are set to "0" by the PRT request master 207. The PRT request target 219 will ignore the content of any reserve fields other than for checking parity. The PRT request master device creates a programming interface that makes the PRT SIZ/Address requirements transparent to the software. This means the PRT request master 207 does not restrict its device driver to only use the transfer size granularities described. Instead, the PRT request master is able to accept a wide range of transfer sizes from the device driver and generate a series of PRT requests, using allowable PRT sizes, to satisfy the total byte count being requested. In order to accomplish that and also to maximize performance, the PRT request master 207 manages its PRT requests such that the use of small and odd sized transfers is minimized whenever possible. This means that a PRT request master first requests a small transfer to get to the nearest 64 byte boundary before issuing a larger PRT data transfer. For example, in maximizing PRT request efficiency for large odd sized transfers, a first transfer would include a PRT request with a byte count that is less than 64 bytes and will fetch up to a 64 byte address boundary relative to the source address PRT SA. Mid transfers would include PRT requests with byte counts that are multiples of 64 bytes. Last transfers would include PRT requests with a byte count that is less than 64 bytes to finish off the data fetch that is needed for the total data block requested.

The PCI configuration field PRT_Max_SIZ(4:0) is used to control the maximum data block size, i.e. byte count, a PRT request master can request. That field provides a way to adjust the PRT command flow to maximize performance based on the characteristics of the PRT PCI devices, i.e. data buffering depth and sensitivity to latency. The value in the PRT_Max_SIZ field will effectively limit the length of time that a PRT request target takes to process each PRT request. By setting the PRT_Max_SIZ to a smaller value, the effective bandwidth will decrease but the average latency may be reduced if the PRT request target's capacity to accept a PRT request is less than what the PRT request Masters can produce. In the present example, configuration software controls the PRT request size such that if a particular PCI bus is dedicated solely to supporting only one high speed graphics device that has deep buffers and needs maximum DMA performance to system memory, then the PRT_Max_SIZ field is set to the large size (i.e. 1024 in the example) to maximize performance. However if a particular PCI bus has a mixture of deeply buffered devices that issue large PRT requests, and shallow buffered devices that produce a high rate of small data size PRT requests, then the PRT_Max_SIZ field is set to a smaller size in order to control the latency required by the shallow devices. The smaller PRT_Max_SIZ setting will increase the rate at which the PRT request target can process PRT requests which will reduce the wait time for the acceptance of new PRT requests.

The PRT request master in the present example is also capable of sending out multiple PRT request transfers using the normal burst transfer defined by the PCI specification. Each PRT request transfer consists of two address phases (PRT SA and PRT DA) and one information phase (PRT IP). The first address phase, i.e. PRT SA, appears during the cycle FRAME goes active. The second PRT address phase PRT DA appears during the first PCI data phase. The PRT information phase PRT IP occurs during the second PCI data phase. A second PRT transaction (PRT SA and PRT DA and PRT IP) can occur in the third, fourth and fifth PCI data phases of the burst transfer. There is no maximum to the number of PRT requests that can occur under a single PCI burst transfer.

The PRT request master controls how many PRT transactions are sent by performing PCI master termination. The PRT request target controls how many PRT transactions it accepts by doing PCI target termination. A PRT transaction is accepted by the PRT request target when all of the address and information portions of the PRT transaction are accepted by the PRT request target. The PRT request target may accept one or both parts of the PRT request address for evaluation but may terminate the transfer before accepting the PRT IP portion, which indicates that the PRT request transaction was not accepted. The PRT request master must only attempt to perform master termination at a point in the PRT request that would result in the PRT IP information being on the bus in the last data phase of the PCI transfer, i.e. only the PRT request target can terminate the PRT request in the middle of a PRT request. The PRT request master and the PRT request target can use PCI signals IRDY and TRDY to "pace" the flow of the PRT transaction with a burst.

The PRT request target must insure that any new PRT SA address fields in a PCI burst transfer fall within the PRT request target's memory space before accepting the PRT IP field. If the address is not owned by this PRT request target, the target must terminate the burst transfer. This will cause the PRT request master to re-issue the full PRT request transfer (PRT SA and PRT DA and PRT IP) again. A new PRT request target now seeing the PRT SA with the fall of FRAME may then decode the PRT address and accept the data portion.

The PRT request target considers it an error condition if it receives a PRT request that has a SA and SIZE field that is not fully contained within the PCI memory space defined for this PRT request target. PRT request targets in the present example, require configuration software to allocate PCI memory space on a 4K page granularity in order to prevent this situation from occurring i.e. the above definition for the SIZE/PRT SA restricts a 4K page crossing within a single PRT request transaction. The target will retry or disconnect when it can no longer accept any more PRT transaction requests, which may occur for example, due to a buffer full condition. Within a bursted sequence of PRT transactions, the PRT request master is not required to issue addresses that represent requests for sequential blocks of data in memory although this may be the typical application for the PRT. The PRT DA or PRT SA addresses from one PRT request to the next may in fact jump to another PRT device's address space. The PRT request target is responsible for terminating the burst if a PRT request address within the burst is outside of the target's memory range.

A PRT target response to a PRT master request contains two parts: the destination address DA and the data packet. The PRT request packet is distinguished from the PRT response packet by predetermined address bits which are bit positions (1:0) in the present example. Both have the same command field setting but the PRT request must always be four byte aligned. The decode for PRT address positions (1:0) for PRT commands in the present example is as follows: "00"—PRT request packet; "01"—PRT response packet with no error; "10"—Reserved; and "11"—PRT response packet with error. The PRT request target will use the destination address received in the PRT request packet as the initial destination address in the PRT response packet. As PRT request data is delivered, the PRT response master will internally increment its destination address such that if the total PRT response transaction is terminated, a new PRT response burst will be initiated using a new destination address that reflects where the previous PRT response burst was terminated.

The PRT response target device, which typically was the PRT request master device, is identified by the destination address DA, the PRT command, and the PCI address (1:0) in the PRT response packet. The PRT response target device can determine when all the PRT request data has returned by counting the data as it returns from the PRT response master. For improved performance, the data should be returned to the PRT response target in sequential order relative to the destination address. A PCI to PCI bridge that supports the PRT transaction does not have to correlate the SIZE field in PRT requests to the data returned in the PRT responses as described above. The above description is intended for the device that initiated the PRT request which needs to know when all of the data which it requested has returned.

The delivery of the PRT responses is controlled by using FRAME, IRDY, TRDY and STOP. The PRT response master can suspend the delivery of data at any point by doing PCI master termination. The PRT response target is also allowed to terminate the transfer with PCI target termination. This may result in the PRT response target receiving the requested data block requested in the PRT request to be received in several segments across several separate PCI burst transactions.

When a PRT response is terminated by either the PRT response master or the PRT response target, the PRT response master will, in the present example, re-arbitrate and resume the transfer where the previous burst ended using a PRT DA that has been incremented to reflect the starting address of the new burst transfer. The PRT command maximizes PCI bus efficiency by providing a way for the PRT request master device to request data at a rate at which it can be consumed. Since the requester and the consumer of the data can be the same device with PRT transactions, this is possible.

Ordering rules for PCI data transfer transaction requests are set forth in the above-identified PCI specification. In general, ordering rules define priorities for the return of data requested within a PCI system. In some cases, certain types of data are allowed to "pass", or be returned ahead of, other types of requested data in being returned to a requesting agent. In other situations, data requests are not allowed to pass. Typically, all requests are not returned in the same order as the original request had been placed or generated, but rather the requests are returned in accordance with an ordering table which sets forth a system designer's priorities generally in the form of arbitration rules. As noted in the PCI specification, a transaction is considered to be a request when it is presented on the bus. When the transaction is terminated with a Retry, it is still considered a request. A transaction becomes "complete" or a "completion" when data actually transfers, or is terminated with a "master abort" or a "target abort". A transaction that is terminated with a retry has no ordering relationship with any other access. Ordering of accesses is only determined when an access completes and data is transferred.

In a PCI system, a delayed transaction progresses to completion in three phases: (1) request by a master; (2) completion of the request by the target device; and (3) completion of the transaction by the master. During the first phase, the master generates a transaction on the bus, the target decodes the access, latches the information required to complete the access, and terminates the request with "Retry". The latched request information is referred to as a "delayed request". During the second phase, the target independently completes the request on the destination bus using the latched information from the delayed request. The result of completing the delayed request on the destination bus produces a "delayed completion", which consists of the latched information of the delayed request and the completion status, as well as the data if the request is a read request. During the third phase, the master successfully re-arbitrates for the bus and reissues the original request. The target decodes the request and gives the master the completion status and the data if a read request. At that point the delayed completion is retired and the transaction has completed. If the target is not ready to send or receive data in accordance with the request by the master when the master reissues the original request during the third phase, the data can not be transferred and the transaction can not be completed until the target is ready to complete the transaction. This results in the generation of frequent fruitless second and subsequent requests by a master when the target is not yet ready to complete a requested transfer. These repeated re-requests by a master for requested data transfer produce inherent system inefficiencies and reduce available system bandwidth while busses are tied-up with transmitting repeated requests of original requests before the target is ready to complete. As herein discussed, the pipelined read transfer methodology obviates the noted inefficiencies and wasted bandwidth by enabling the target to become the master for the completion of the data transaction with the originating master. When the target is ready to comply with the original data transfer request, the target will become the master and initiate the completion of the transaction without waiting for a re-request from the original master. With this methodology, the intermediate busses need not be tied-up with fruitless re-requests for originally requested data transfers which are made before the target is enable. Instead, the target becomes the master when it is ready and initiates the completion without intervening requests from the originating master. The new ordering rules for the pipelined read transfers insure compatibility and system optimization with the pipelined read transfers within PCI systems.

Ordering rules for PCI requests which are not PRT requests, remain the same although the ordering rules for PRT (pipelined read transfer) requests are added as indicated in columns 7 and 8, and rows 6 and 7 in FIG. 9. The table in FIG. 9 represents the ordering rules when a bridge in the system is capable of allowing multiple transactions to proceed in each direction at the same time. Each column of the table represents an access that was accepted by the bridge earlier, while each row represents a transaction just accepted. The contents of the box indicate what ordering relationship the second transaction must have to the first. A PMW (posted memory write) is a transaction that has completed on the originating bus before completing on the destination bus and can occur only for Memory Write, and Memory Write And Invalidate commands. A DRR (delayed read request) is a transaction that must complete on the destination bus before completing on the originating bus. A DWR (delayed write request) is a transaction that must complete on the destination bus before completing on the originating bus. A DRC (delayed read completion) is a transaction that has completed on the destination bus and is now moving toward the originating bus to complete. A DWC (delayed write completion) is a transaction that has completed on the destination bus and is now moving toward the originating bus. A "N" designation in FIG. 9 indicates that a subsequent transaction is not allowed to pass a previous transaction to preserve ordering in the system. "Y" indicates that a subsequent transaction must be allowed to pass a previous transaction. A "Y/N" indicates that the bridge designer may choose to allow the subsequent transaction to complete before the previous transaction, or not.

In FIG. 9, columns 7 and 8, together with rows 6 and 7 have been added to the PCI specification ordering rules to reflect the new ordering requirements added for PRT transactions. PRTR requests are memory read requests by a master on the bus. PRTC are memory read completion data sent to he requesting master, once the PRT target (now operating as a master) has obtained the data. In the added table entries for PRT transactions, a parenthesis around the "Y" in a "Y/N" entry indicates it is strongly recommended for performance reasons to allow the transaction to pass. The following comments apply to the added new table entries for PRT transactions:

Row 1, Column 7: Required to be allowed to pass;
Row 1, Column 8: Required to be allowed to pass;
Row 2, Column 7: Recommended to be allowed to pass for performance;
Row 2, Column 8: Recommended to be allowed to pass for performance;
Row 3, Column 7: Recommended to be allowed to pass for performance;
Row 3, Column 8: Recommended to be allowed to pass for performance;
Row 4, Column 7: Required to be allowed to pass;
Row 4, Column 8: Required to be allowed to pass;
Row 5, Column 7: Required to be allowed to pass;
Row 5, Column 8: Required to be allowed to pass;
Row 6, Column 2: Not allowed to pass for proper data consistency;
Row 6, Column 3: Recommended to be allowed to pass for performance;
Row 6, Column 4: Recommended to be allowed to pass for performance;
Row 6, Column 5: Recommended to be allowed to pass for performance;
Row 6, Column 6: Recommended to be allowed to pass for performance;
Row 6, Column 7: Recommended to be allowed to pass for performance;

Row 6, Column 8: Recommended to be allowed to pass for performance;
Row 7, Column 2: Must be allowed to pass to avoid deadlocks;
Row 7, Column 3: Recommended to be allowed to pass for performance;
Row 7, Column 4: Recommended to be allowed to pass for performance;
Row 7, Column 5: Recommended to be allowed to pass for performance;
Row 7, Column 6: Recommended to be allowed to pass for performance;
Row 7, Column 7: Recommended to be allowed to pass for performance;
Row 7, Column 8: Recommended to be allowed to pass for performance.

Ordering for PRT requests are similar to those for delayed read requests (DRR), and PRT response ordering rules are similar to those for delayed read completions (DRC). The PRT response master device will typically (although not required to) preserve the return order of data for a given PRT request. If the PRT response master device is able to receive and process several different PRT requests at the same time, i.e. using multiple PRT service channels, then a PRT response master is not required to preserve the return order of data relative to different PRT requests, i.e. channels. For example if a PRT response target has two PRT response channels each assigned and dedicated to servicing different and unique PRT requests, then those two PRT response channels can fetch and deliver PRT response data independently such that the two PRT response channels are able to interleave their access to the PCI bus as they obtain data. This is because each channel is working on different PRT requests which are independent of each other and thus have no ordering requirement relative to each other. If a PRT request target accepted PRT requests in a predetermined order, then the PRT request target becomes a PRT response master and may return response data for the different PRT requests in a different order from that in which the PRT requests were received. For example, PRT requests may be issued in the following order: (1) PRT DA 80000040, 256 bytes; (2) PRT DA=81000020, 128 bytes; and (3) PRT DA=82000000, 64 bytes. The PRT responses may be returned in the following order: (1) PRT DA=82000000, first 32 bytes; (2) PRT DA 81000020, 128 bytes; (3) PRT DA=80000040, 256 bytes; and (4) PRT DA=82000020, second 32 bytes.

In PCI to PCI bridge transfers, PRT requests are treated like PCI read requests when it comes to ordering rules. There is no requirement that PCI read requests must pass other PCI read requests or that they must stay strictly ordered. However, for performance reasons, a PCI to PCI bridge should allow standard PCI read requests to pass any PRT requests when a PRT request is being retried. This is because PCI read traffic will typically move smaller data transfers than that associated with PRT requests so the wait time for the acceptance of a standard PCI read being retried will be less than that of a PRT request being retried.

A PRT request master that encounters a PCI target that doesn't support the PRT command can detect that when DEVSEL# is not active. As a result, the PRT request master can reissue the address using a normal PCI read command so that the non-PRT target will now respond to the address. This sequence is also applicable to PCI to PCI bridge transfers.

In FIG. 3 through FIG. 6, a typical functional flow for a pipelined read transfer is illustrated. At the start of a PRT operation 301, a determination is made as to whether a master engine has triggered 303 to do a PRT based data transfer. If so, a PRT request master 207 loads information concerning the transfer 305 from a local bus interface 203 through a programming interface 205. The pipelined read transfer information packet includes the source address SA, the target or destination address DA and the total byte count of the transfer. Next, a determination is made as to the current PRT command based on total byte count to be sent and the allowable PRT transfer size 307. If all of the PRT requests have been issued to exhaust the total byte count 309 the process returns to await the next trigger to do a PRT transfer 303. If all PRT requests have not been issued 309, a determination is made as to whether internal buffer space is available 311 for the loading of PRT response data 211 when it is returned in response to the request. If space is available, a PCI request is activated 313 and a determination is made when the PCI grant is active 315. At that time, the current PRT request is issued 317 and a determination is made as to whether the PRT is accepted 319 by the request target 219. If not, a PCI request is again activated 313. When the PRT transfer is accepted 319 by the PRT request target 219, the request master 207 then prepares for the next PRT transfer 321 and determines the current PRT command based on total byte count to be sent and allowable PRT transfer size 307. Next the PRT request master 207 determines if all PRT requests have been issued 309. The method will then cycle until all PRT requests have been issued 309 at which time the PRT request master 207 will await the next PRT trigger 303.

Figure 4:
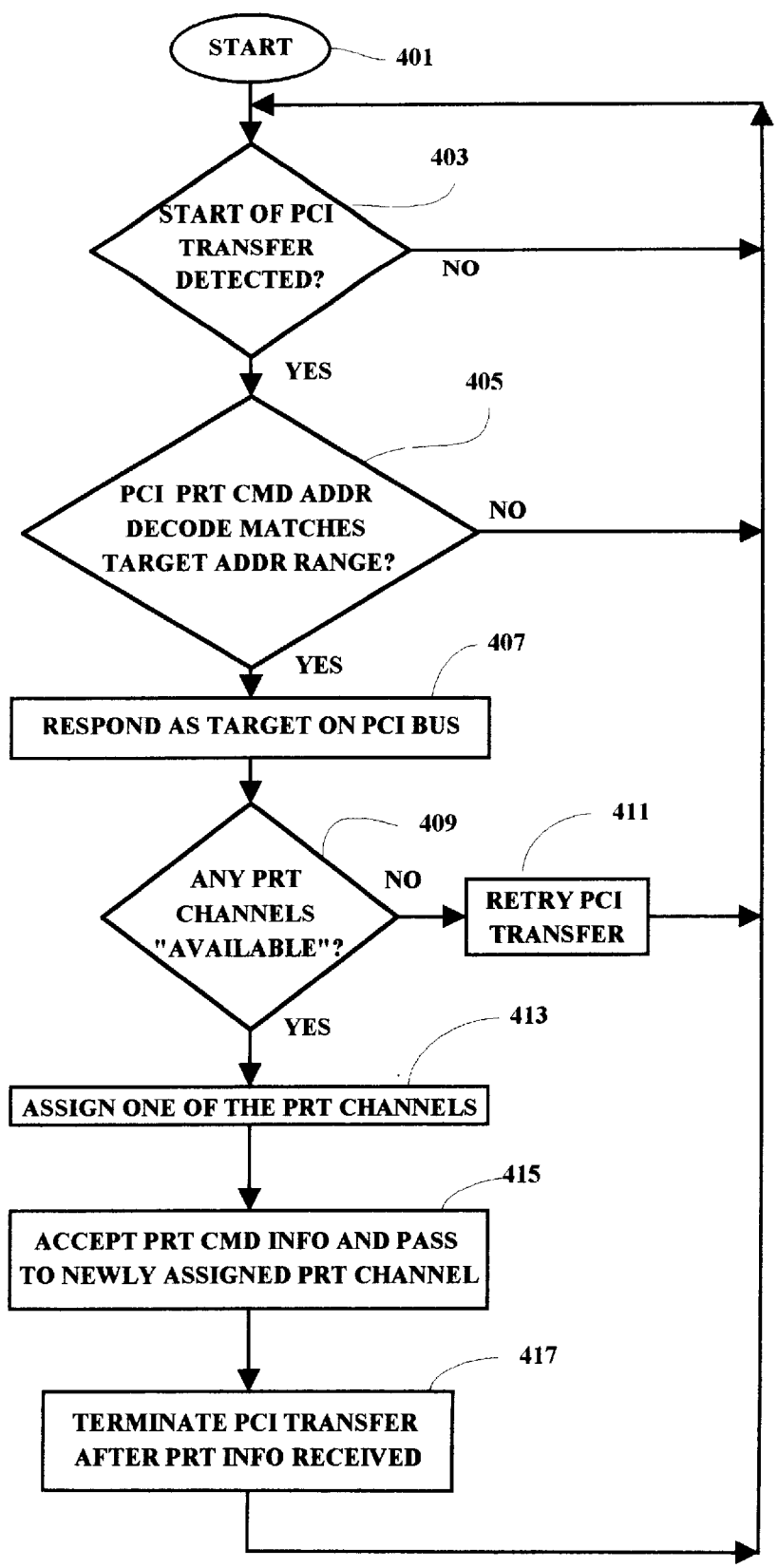
FIG. 4 is a flow chart illustrating a functional flow for a PRT request target operation.

The functional flow at the PRT request target 219 is illustrated in the flow chart of FIG. 4. When the processing begins 401, a detection of a start of a PCI transfer is made 403 and a determination is made that the PCI PRT command address matches the target address range 405. If either determination is negative, the process cycles on detections of PCI transfers. When the PCI PRT command address decode matches the target address range 405, the PRT request target 219 responds as the target on the PCI bus 407. If no PRT channels are available 409, the process returns to retry the PCI transfer 411. When PRT channels are available 409, one of the PRT channels is assigned 413, and the PRT command information packet IP is accepted and passed to the newly assigned PRT channel 415. After the PRT information has been received by the PRT request target 219, the PCI transfer is terminated 417 and the process returns to await the start of the next PCI transfer 403.

Figure 5:
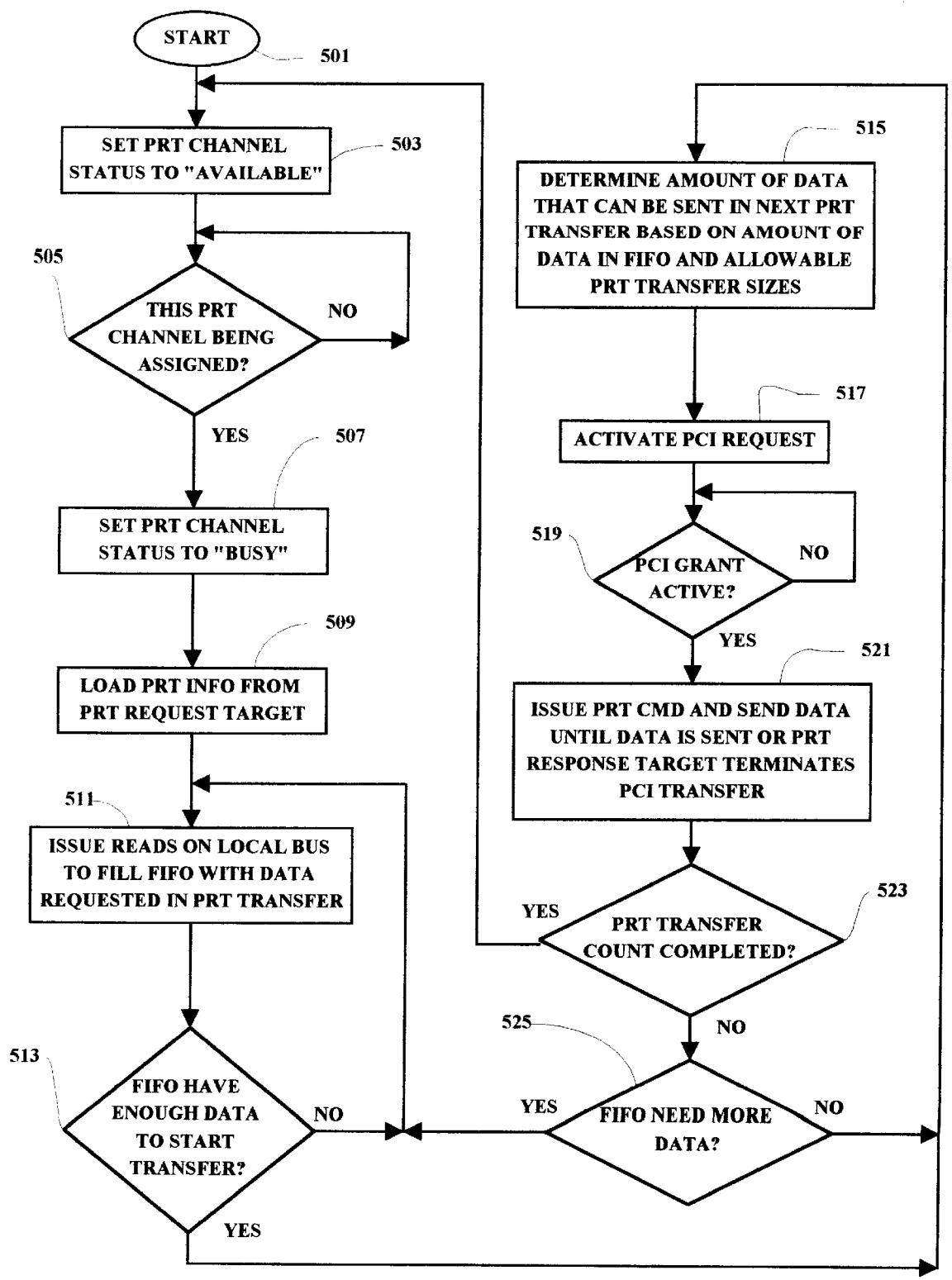
FIG. 5 is a flow chart illustrating a functional flow for a PRT response master operation.

The functional flow at the PRT response master 221 is illustrated in the flow chart of FIG. 5. After the process is started 501, the PRT channel status is set to "available" 503. When the PRT channel is being assigned 505, the PRT channel status is set to "busy" 507. The PRT information is then loaded 509 from the PRT request target 219 to one of the PRT response masters 221. At that point, reads are issued on the local bus 225 through the local bus interface 223 to fill the FIFO (PRT data buffers 227) with data requested by the PRT. That process will continue until the FIFO 227 has enough data to start the transfers 513 at which time a determination is made as to the amount of data that can be sent in the next PRT transfer based on the amount of data in the FIFO and the allowable PRT transfer sizes 515. A PCI request is activated 517 and when a PCI grant goes active 519, a PRT command is issued 521 by the PRT response master 221, and data is sent to the PRT response target 211 and the PRT data buffers 215 until all of the data is sent or the PRT response target 211 terminates the transaction. When the transfer count has been completed 523 the PRT response master 221 returns to set the PRT channel status to "available" 503 and await the next assignment 505. If the PRT transfer count was not completed 523, and the FIFO needs more data 525, the process returns to issue additional read calls on the local bus 511. Otherwise, if the FIFO does not need more data 525, the process returns to determine the amount of data that can be sent in the next PRT 515.

Figure 6:
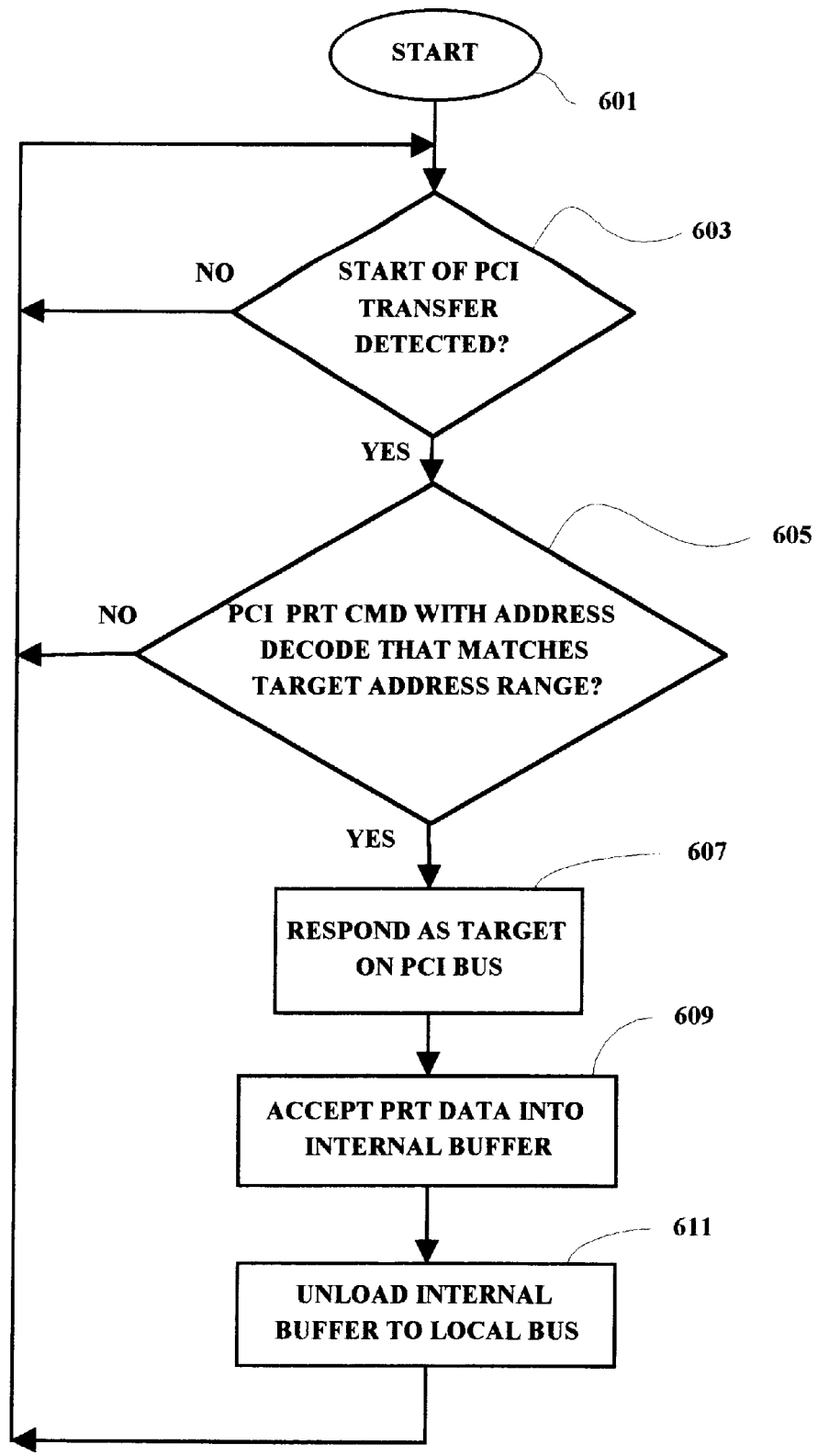
FIG. 6 is a flow chart illustrating a functional flow for a PRT response target operation.

The functional flow at the PRT response target 211 is illustrated in the flow chart of FIG. 6. After the process start 601, and the start of a PCI transfer has been detected 603, a determination is made as to whether the PCI PRT command has an address decode that matches the target address range 605 for the PRT response target 211. If so, the PRT response target 211 responds 607 as a target on the PCI bus. The PRT data is then accepted 609 into the PRT data buffers or internal buffers 215 from the PRT data buffers 227. Although not required, an intermediate step may be added before the PRT data is accepted, to check the internal buffer of the response target to insure that there is sufficient memory space available to receive the PRT data. The internal buffer 215 then unloads the data 611 to the local bus 213 through the local bus interface 203 to fulfill the original PRT request, and the PRT response target process returns to await detection of the next PCT transfer 603.

Figure 7:
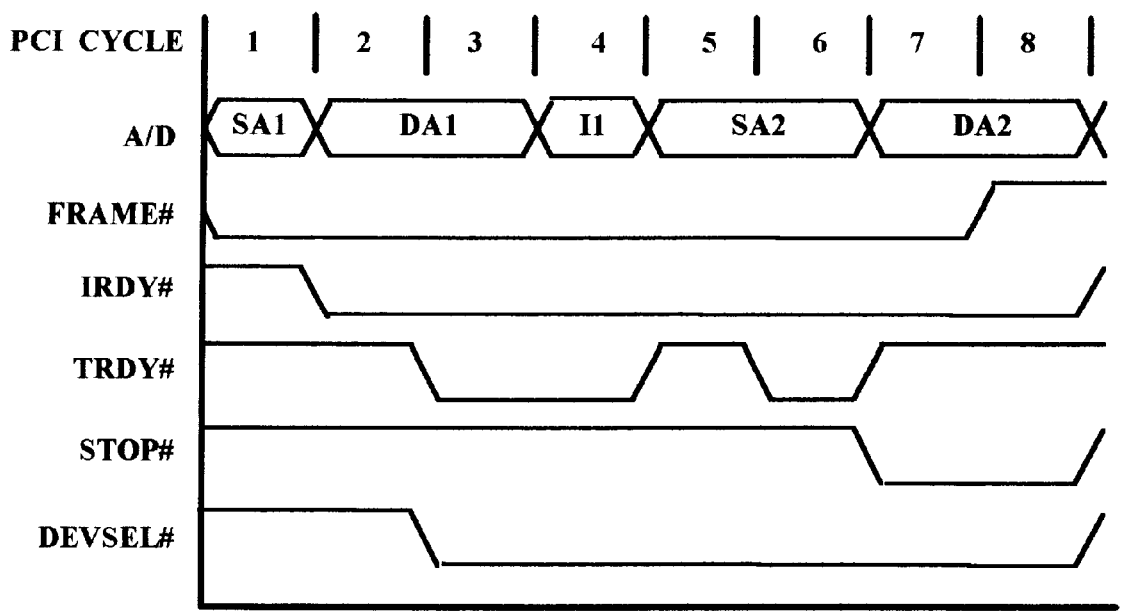
FIG. 7 is a timing chart illustrating the relationships between several of the signals generated in an exemplary operation of a PRT master request PCI burst.

An example showing the signal relationships for a PRT master request PCI burst is illustrated in FIG. 7. In the example, the PRT request master 207 is attempting to burst two PRT request transactions. The PRT request target 219 accepts the first PRT transaction but does not accept the second. As illustrated, during cycle 4, the PRT request target accepts PRT request 1 (PRT-SA1/PRT-DA1, PRT-I1) because IRDY and TRDY were active when PTR-I1 was on the bus. In cycle 5, the PRT request master puts PRT SA-2 on the bus i.e. burst. In cycle 6, the PRT request target evaluates PRT-SA2 and determines that it matches its address range and can process the request. In cycle 7, the PRT request target determines it cannot process the second PRT transfer and notifies the PRT request master by terminating the PRT transfer before the PRT-I2 is accepted. If the PRT request target was able to accept the second transaction, it could have activated TRDY i.e. cycle 7 and cycle 8, indicating it was accepting the PRT-DA2 and PRT-I2 portions.

The PRT request master issuing a PRT request transaction drives REQ__64 inactive causing PRT transaction (PRT SA, PRT DA, PRT IP) to be passed across the low 32 bits of the address bus. The PRT response master returning PRT response data can deliver data using 32 bits or 64 bits depending on REQ64__/ACK64__. DAC addressing could also be used but if the PRT request master does a burst, all PRT addresses must be consistent i.e. all DAC or all non DAC addresses. In the case of DAC, a PRT request transaction will consist of 5 PCI phases, i.e. four for the address and one for the information field PRT IP.

Figure 8:
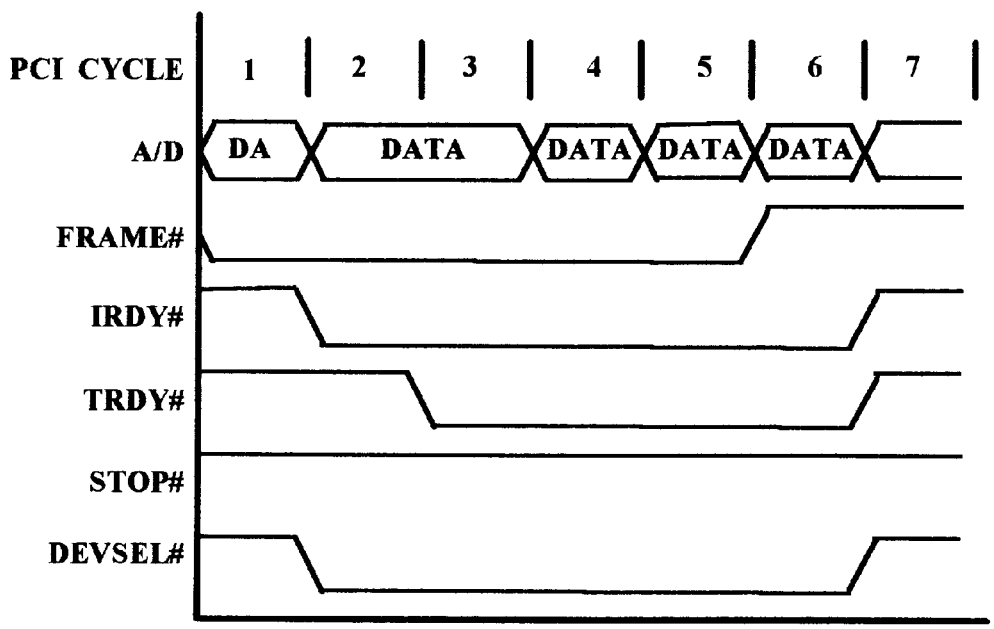
FIG. 8 is a timing chart illustrating the relationships between several of the signals generated in another exemplary operation example of a PRT master response PCI burst.

An example showing the signal relationships for a PRT master response PCI burst is illustrated in FIG. 8. The PRT response master is attempting to burst four PRT request data transfers, i.e. 16 bytes. The PRT response target accepts all four data transfers. A PRT response transaction burst consists of one PRT DA and multiple PRT response data phases. There is no second PRT DA issued in a single PRT response burst.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method of transferring a data segment from a target device to a source device over an intermediate PCI bus arranged between said source device and said target device, in response to a source data request by said source device, said intermediate PCI bus being arranged for selectively coupling other devices together in a processing system, said method comprising:

sending said source data request for said data segment from said source device to said target device over said intermediate PCI bus, said request including an address for said target device, a specified address for said source device and a transfer size for said data segment;

releasing said intermediate PCI bus for use by said other devices after said target device has received said source data request;

assuming a master device function by said target device upon completion of an acquisition of said data segment; and returning said data segment from said target device to said source device, said target device being operable as a master device to complete said return of said data segment from said target device to said source device using said specified address of said source device and without waiting for a re-request for said data segment by said source device.

2. The method as set forth in claim 1 and further including: including information descriptive of the requested data segment size in said request.

3. The method as set forth in claim 1 and further including: tagging said source data request by said target device, said tagging being effective for catagorizing said data request in accordance with a predetermined schedule.

4. The method as set forth in claim 2 and further including:

tagging said source data request by said target device, said tagging being effective for catagorizing said data request in accordance with a predetermined schedule.

5. The method as set forth in claim 3 wherein said tagging is accomplished according to a type of data transfer requested by said source device.

6. The method as set forth in claim 4 wherein said tagging is accomplished according to a type of data transfer requested by said source device.

7. The method as set forth in claim 3 wherein said tagging is accomplished according to a sequence in which said source data request is received by said target device.

8. The method as set forth in claim 4 wherein said tagging is accomplished according to a sequence in which said source data request is received by said target device.

9. The method as set forth in claim 3 wherein said tagging is accomplished according to a size characteristic of said source data request.

10. The method as set forth in claim 4 wherein said tagging is accomplished according to a size characteristic of said source data request.

11. The method as set forth in claim 1 and further including:

completing an acquisition by said target device of data requested by said source data request; and initiating a return of said data acquired by said target device, said return being initiated by said target device upon completion of said acquisition by said target device.

12. The method as set forth in claim 11 wherein said initiating includes requesting access to a data bus for returning said data acquired.

13. The method as set forth in claim 2 and further including:

completing an acquisition by said target device of data requested by said source data request; and initiating a return of said data acquired by said target device, said return being initiated by said target device upon completion of said acquisition by said target device.

14. The method as set forth in claim 13 wherein said initiating includes requesting access to a data bus for returning said data acquired.

15. The method as set forth in claim 3 and further including:

completing an acquisition by said target device of data requested by said source data request; and initiating a return of said data acquired by said target device, said return being initiated by said target device upon completion of said acquisition by said target device.

16. The method as set forth in claim 15 wherein said initiating includes requesting access to a data bus for returning said data acquired.

17. The method as set forth in claim 4 and further including:

completing an acquisition by said target device of data requested by said source data request; and initiating a return of said data acquired by said target device, said return being initiated by said target device upon completion of said acquisition by said target device.

18. The method as set forth in claim 17 wherein said initiating includes requesting access to a data bus for returning said data acquired.

19. The method as set forth in claim 5 and further including:

completing an acquisition by said target device of data requested by said source data request; and initiating a return of said data acquired by said target device, said return being initiated by said target device upon completion of said acquisition by said target device.

20. The method as set forth in claim 19 wherein said initiating includes requesting access to a data bus for returning said data acquired.

21. The method as set forth in claim 6 and further including:

completing an acquisition by said target device of data requested by said source data request; and initiating a return of said data acquired by said target device, said return being initiated by said target device upon completion of said acquisition by said target device.

22. The method as set forth in claim 21 wherein said initiating includes requesting access to a data bus for returning said data acquired.

23. The method as set forth in claim 7 and further including:

completing an acquisition by said target device of data requested by said source data request; and initiating a return of said data acquired by said target device, said return being initiated by said target device upon completion of said acquisition by said target device.

24. The method as set forth in claim 23 wherein said initiating includes requesting access to a data bus for returning said data acquired.

25. The method as set forth in claim 8 and further including:

completing an acquisition by said target device of data requested by said source data request; and initiating a return of said data acquired by said target device, said return being initiated by said target device upon completion of said acquisition by said target device.

26. The method as set forth in claim 25 wherein said initiating includes requesting access to a data bus for returning said data acquired.

27. The method as set forth in claim 9 and further including:

completing an acquisition by said target device of data requested by said source data request; and initiating a return of said data acquired by said target device, said return being initiated by said target device upon completion of said acquisition by said target device.

28. The method as set forth in claim 27 wherein said initiating includes requesting access to a data bus for returning said data acquired.

29. The method as set forth in claim 10 and further including:

completing an acquisition by said target device of data requested by said source data request; and initiating a return of said data acquired by said target device, said return being initiated by said target device upon completion of said acquisition by said target device.

30. The method as set forth in claim 29 wherein said initiating includes requesting access to a data bus for returning said data acquired.

31. The method as set forth in claim 1 wherein said target device is selectively operable for tagging said source data request, said tagging being effective for categorizing said data request in accordance with a predetermined schedule.

32. A method for transferring a data segment from a target device to a source device over an intermediate PCI bus arranged between said source device and said target device, in response to a source data request by said source device, said method comprising:

completing an acquisition of said data segment by said target device;

assuming a master device function by said target device;

re-acquiring control over said intermediate PCI bus by said target device after completing said acquisition of said data segment; and completing a data transfer from said target device to said source device over said intermediate PCI bus, said transfer being completed by said target device acting as a master device using a source address furnished to said target device as a part of said source data request and without waiting for a re-request for said data segment by said source device.

33. The method as set forth in claim 31 wherein said initiating includes requesting access to a data bus by said target device for returning said data segment.

34. An information processing system comprising:

a source device;

a target device; and a PCI bus, said PCI bus being arranged for accomplishing data transfer transactions between said source device and said target device, said source device being selectively operable for sending a source data request for a data segment from said source device, said source data request including an address for said target device, said request further including an address for said source device and a transfer size for said source data, said source device and said target device being operable to release said PCI bus for use by other devices in said information processing system after said source data request has been received by said target device, said target device being operable to assume a master device function to re-acquire control of said PCI bus to accomplish a return of said data segment from said target device to said source device using said source device address furnished to said target device with said source data request, said data segment being returned without waiting for a re-request for said data segment by said source device.

35. The information processing system as set forth in claim 34 wherein said request further includes information descriptive of the requested data segment size.

* * * * *